Nov. 17, 1931.      S. CROFT      1,831,846
CANDY CONVEYING AND FINISHING APPARATUS
Filed Aug. 4, 1928
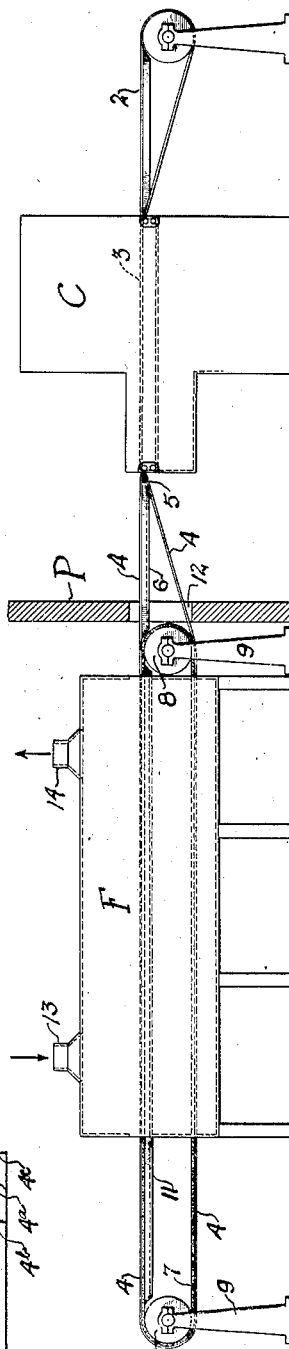
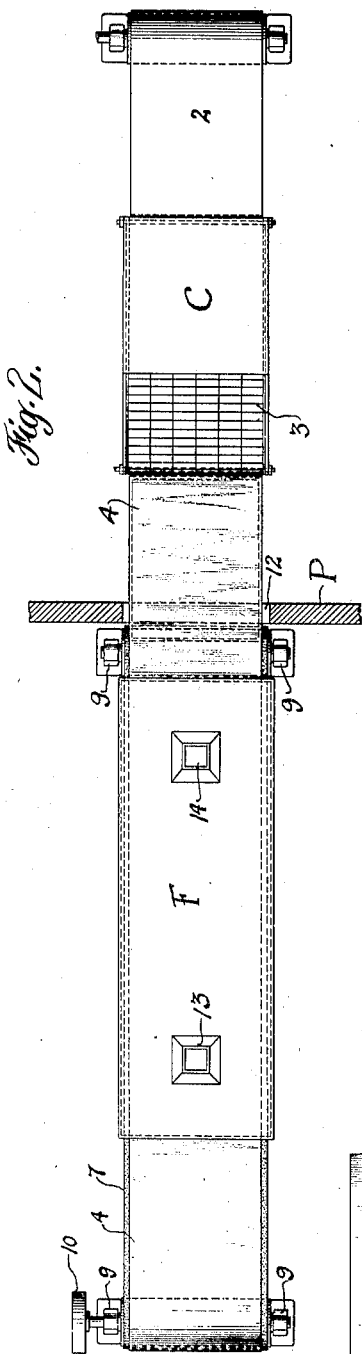
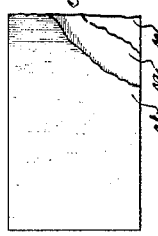
INVENTOR
Samuel Croft
BY
Synnestvedt & Lechner
ATTORNEYS Patented Nov. 17, 1931

1,831,846

UNITED STATES PATENT OFFICE

SAMUEL CROFT, OF BRYN ATHYN, PENNSYLVANIA

CANDY CONVEYING AND FINISHING APPARATUS

Application filed August 4, 1928. Serial No. 297,514.

This invention relates to candy conveying and finishing apparatus and particularly to belting employed in such apparatus.

One of the primary objects of the invention is the improvement of the finish of machine-made or machine-coated candy or confections.

Another principal object of the invention is the improvement and lengthening of the life of belting employed in candy conveyors.

Other objects of the invention are: to improve the operation of candy conveying and finishing apparatus and reduce the cost of maintenance thereof; to obviate cracking or peeling of the surface of candy conveyor belting; to produce a belting which will give a very high gloss to the bottom of candles, particularly chocolates, while they are being cooled, and which will take and retain embossing or raised lettering; and to provide a conveyor belting which will not take up cocoa-butter or absorb water, and one which may be readily cleaned without any resultant harm.

More specifically, I aim by my invention to provide a belting for candy or confection conveyors which, while retaining the flexibility of cloth or paper belt conveyors such as ordinarily employed, will do away with certain disadvantages usually incident to such belts, such as cracking, peeling, and absorbing moisture and fats, and will, in addition attain certain other positive advantages not heretofore attained. In particular, I provide a belting which is coated with a material of highly glossed or lustrous finish so as to produce a glossy finish on the bottom of the conveyed candies, which is highly flexible so as to pass around the usual "knife-edge" at the point where the conveyor receives the candies without cracking or peeling or losing its gloss, which is of such a body or composition as to take and retain clear imprinting or embossing, which will not take on cocoa-butter or other unwanted substances nor give off an unpleasant odor or taste to the candies, which is also preferably provided with an undercoating of a flexible friction material for driving purposes and for added strength, and which is of much longer life than ordinary candy conveyor belting.

How I attain the foregoing, together with such other objects and advantages as are incident to the invention or will occur to those skilled in the art, will clearly appear hereinafter, reference being had to the accompanying drawings, in which:

Figure 1 is a somewhat diagrammatic side-elevational view of a candy coating and finishing apparatus embodying my invention;

Figure 2 is a plan view of the same; and

Figure 3 is a partially broken-away plan view of my improved belting, illustrating the layers used in its construction in the preferred form.

By reference first to Figs. 1 and 2, it will be seen that I have illustrated (in outline) a chocolate candy coating machine or device C, and a finishing or cooling arrangement F, which, in practice, are located in separate rooms on either side of the wall or partition, indicated at P, since the coating process is a hot process and the finishing process a cold one.

The candy centers are fed in from th right, by conveyor 2, to the screen- or wire-belt 3 in the machine C, where melted chocolate is poured over them, in a manner well known in this art. The wire-belt 3 conveys the coated candies to the finishing and cooling belt 4, which, in order to receive them from the wire belt, must run over a knife-edge 5 positioned closely adjacent the wire-belt. This knife-edge is, in fact, a rounded edge drawn on a very small radius, for example an eighth of an inch or less, and may well be formed on the end of the supporting member 6.

The belting 4 (embodying the features of the present invention hereinafter to be described) forms an endless conveyor, preferably driven by, and resting, in its upper pass, on the canvas or flexible metallic belt 7, which runs between two rolls 8, supported in turn on uprights 9; and one of said rolls may be driven through the medium of a pulley 10. Where the belt 7 is made of canvas or the like, as here shown, it is preferably supported by a structure 11, which may be in the form of a brine tank for cooling the candies from below. The candies are at the same time additionally cooled, after passing to the left through the opening 12 in wall P, by their passage on belt 4 through the cold-box F which is preferably cooled by a draft of air blown into inlet 13 and passing off through the outlet 14.

The belt 4 has, as its base, a flexible body 4a (see Fig. 3) which may be of paper, preferably 100% rag stock although it may be partly of rope stock with even a small percentage of wood pulp.

On one side the belting is coated with a layer of highly flexible varnish 4b having a glossy surface or finish. The combination of a flexible paper body with a coating of glossy flexible varnish gives an hitherto unattained gloss on the bottom of the chocolates as they are cooled. Furthermore, a good quality of rag paper, so coated, will take a clear embossing, of the candy-maker's name for example, and retain it for the life of the belt. While various flexible coatings may be employed, I contemplate the use of a material which shall be highly flexible without being "tacky", and which may be baked onto the paper so as to give a composite structure which is strong enough to take the pulling stresses but which is at the same time very thin so as to facilitate heat transfer. To this end I employ a varnish made of the following ingredients, in substantially the proportions indicated: 1 lb. lead resinate, 3 lbs. manganese resinate, 222 lbs. aged linseed oil, 76 lbs. china wood oil, 47½ gals. kerosene, 20¾ lbs. paraffin.

A very good varnish for the purpose is made by aging the linseed oil to a heavy body, heating it and the china wood oil to about 300° F., mixing the oils, raising the temperature of the mixture to about 450° F. for approximately 2 hours, adding the lead resinate in dry form, adding the paraffin, dissolving the manganese resinate in about 2½ gallons of the kerosene and adding this solution, and then adding the balance of the kerosene. To coat the paper, it is run through a one side coating machine having a roll which throws the varnish against one side of the paper, at a speed that gives the desired thickness and uniform coating. The varnish is then preferably baked on at a temperature of from 240 to 260° F. This produces a composite belting in which the varnish and the paper are so bonded together that the former reinforces the latter, so that together they have ample strength while being much thinner than other belting, such as the ordinary "sized" or "filled" cloth belting, heretofore used. A coating of the character described furthermore will not crack or peel off. This, I have found, is due not only to the baking on, but also to the fact that the flexible varnish used has both elongation and elasticity sufficient to meet the give and stretch of the paper base under service conditions.

Returning now to a consideration of Fig. 3 it will be seen that I have indicated an undercoating or sizing 4c on the bottom of the belting, which may be of a frictional material such as latex or milk rubber, for the purpose of increasing the strength and lengthening the life of the belt without impairing its flexibility, and for increasing the frictional engagement of belt 4 with belt 7, it being understood that this elastic frictional sizing coating is applied to the under side of the paper body of the belting in instances where the paper employed has a surface which tends to slip with respect to the carrier-belt 7.

The belting of the present invention has a life of from 2 to 4 weeks or more as against a life of 1 to 3 days for the calendered paper conveyors ordinarily employed. Obviously, this results in substantial reductions in cost, when it is considered that the run of the conveyor is from 20 to 100 feet or more, requiring a belt of 40 to 200 lineal feet, of a width of from 8 to 32 inches, depending upon the size of the installation and the speed of operation of the cooling mechanism. Since the belts, as applied, must fit the machine accurately, and are ordinarily butt or lap-jointed, it is also clear that a considerable saving of labor is effected by the present invention. Furthermore the improved belting, in addition to its advantages with respect to embossing, the lustrous finish which it imparts to the chocolates, and the absolute freedom from cracking or splitting from constant passage over the knife-edge, possesses the great practical advantage of being freely washable, and in addition does not take up oils and is practically non-hygroscopic.

It will be understood, of course, that my improved finishing paper may be used in sheets or plaques as well as in belt form, if so desired.

What I claim is:—

1. Belting for conveying confections, comprising a base of paper of tensile strength sufficient to withstand the pulling stresses, and a coating of flexible varnish thereon.

2. Belting for conveying confections, comprising a base of paper of tensile strength sufficient to withstand the pulling stresses, and the coating of glossy flexible varnish thereon.

3. Belting for conveying confections, comprising a tough flexible pulling base of paper of tensile strength sufficient to withstand the service stresses, with a thin sizing or coating of elastic friction material on the under side and a coating of glossy material on the upper side.

4. Belting for conveying confections, comprising a base of flexible paper of such character as will readily take and retain embossing, and a glossy flexible coating thereon.

5. In candy-making apparatus, an endless flexible conveyor belt of a thin, tough paper body, adapted to ride on a separate carrier belt, and having a coating of flexible varnish.

6. In candy-making apparatus, a flexible paper conveyor belt having baked thereon, at a temperature such as to preserve the strength of the paper body, a coating of flexible varnish which is non-absorbent as to cocoa-butter.

7. In candy-making apparatus, a flexible paper conveyor belt having baked thereon, at a temperature such as to preserve the strength of the paper body, a coating of flexible varnish which is non-absorbent as a cocoa-butter and non-hygroscopic.

8. A flexible candy conveyor formed of a primary body of thin, tough, flexible paper having a flexible varnishlike coating baked thereon.

9. A flexible candy conveyor including a coating of varnish having a resinate base and containing china wood oil for flexibility.

10. A flexible candy conveyor including a coating of varnish having a resinate base and containing china wood oil for flexibility and paraffin to prevent tackiness.

In testimony whereof I have hereunto signed my name.

SAMUEL CROFT.